United States Patent
Mikoshiba et al.

(10) Patent No.: US 12,129,904 B2
(45) Date of Patent: Oct. 29, 2024

(54) VIBRATION-DAMPING DEVICE

(71) Applicant: Prospira Corporation, Kawasaki (JP)

(72) Inventors: Rei Mikoshiba, Tokyo (JP); Yuki Satake, Tokyo (JP); Akira Ueki, Tokyo (JP)

(73) Assignee: Prospira Corporation, Kawasaki (JP)

( * ) Notice: Subject to any disclaimer, the term of this patent is extended or adjusted under 35 U.S.C. 154(b) by 370 days.

(21) Appl. No.: 17/772,196

(22) PCT Filed: Oct. 13, 2020

(86) PCT No.: PCT/JP2020/038572
§ 371 (c)(1),
(2) Date: Apr. 27, 2022

(87) PCT Pub. No.: WO2021/090645
PCT Pub. Date: May 14, 2021

(65) Prior Publication Data
US 2022/0403911 A1 Dec. 22, 2022

(30) Foreign Application Priority Data

Nov. 7, 2019 (JP) ................................ 2019-202583

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01); *B60K 5/1283* (2013.01);
(Continued)

(58) Field of Classification Search
CPC .... F16F 13/105; F16F 13/107; F16F 2230/36; B60K 5/1208; B60K 5/1283
See application file for complete search history.

(56) References Cited

U.S. PATENT DOCUMENTS

| 4,651,980 A | 3/1987 | Morita et al. |
| 4,679,776 A | 7/1987 | Remmel et al. |

(Continued)

FOREIGN PATENT DOCUMENTS

| CN | 101285513 A | 10/2008 |
| CN | 101883932 A | 11/2010 |

(Continued)

OTHER PUBLICATIONS

International Search Report of PCT/JP2020/038572 dated Nov. 10, 2020 [PCT/ISA/210].

(Continued)

*Primary Examiner* — Thomas J Williams
(74) *Attorney, Agent, or Firm* — KENJA IP LAW PC

(57) ABSTRACT

A partition member includes an orifice passage through which the main liquid chamber and the auxiliary liquid chamber communicate with each other, a plurality of first communication holes through which the main liquid chamber and the accommodation chamber communicate with each other, and a second communication hole through which the auxiliary liquid chamber and the accommodation chamber communicate with each other, in the partition member, a tubular member which protrudes in an axial direction toward an elastic body is disposed on a first wall surface in which the first communication hole opens and which forms a part of an inner surface of the main liquid chamber, the plurality of first communication holes open in both an inner portion located on an inner side than the tubular member and an outer portion located on an outer side than the tubular member of the first wall surface.

6 Claims, 2 Drawing Sheets

(52) U.S. Cl.
CPC ..... *F16F 2228/06* (2013.01); *F16F 2230/186* (2013.01); *F16F 2230/36* (2013.01)

(56) References Cited

U.S. PATENT DOCUMENTS

| | | | |
|---|---|---|---|
| 4,708,329 A | 11/1987 | Tabata et al. | |
| 4,721,292 A * | 1/1988 | Saito | F16F 13/105 180/312 |
| 4,773,634 A | 9/1988 | Hamaekers | |
| 4,903,951 A | 2/1990 | Miyamoto et al. | |
| 4,925,162 A | 5/1990 | Kojima | |
| 4,997,168 A | 3/1991 | Kato | |
| 5,102,105 A | 4/1992 | Hamaekers et al. | |
| 5,464,196 A | 11/1995 | Dankowski | |
| 5,499,799 A | 3/1996 | Kojima | |
| 6,257,562 B1 | 7/2001 | Takashima et al. | |
| 6,390,459 B2 | 5/2002 | Saitoh | |
| 6,612,554 B1 | 9/2003 | Linn | |
| 6,637,734 B2 | 10/2003 | Thomazeau et al. | |
| 6,793,206 B2 | 9/2004 | Reh et al. | |
| 6,923,435 B2 | 8/2005 | Pizanti et al. | |
| 7,258,331 B2 | 8/2007 | Schneider | |
| 7,344,128 B2 | 3/2008 | Muramatsu et al. | |
| 7,802,777 B2 | 9/2010 | Katayama et al. | |
| 8,474,799 B2 | 7/2013 | Michiyama et al. | |
| 8,894,051 B2 | 11/2014 | Yamamoto et al. | |
| 9,046,147 B2 | 6/2015 | Tsutsumi | |
| 9,273,744 B2 | 3/2016 | West | |
| 9,347,516 B2 | 5/2016 | Kadowaki | |
| 9,365,101 B2 | 6/2016 | Okumura | |
| 9,366,309 B2 | 6/2016 | Marienfeld et al. | |
| 9,488,246 B2 | 11/2016 | Satori et al. | |
| 9,719,575 B2 | 8/2017 | Kojima | |
| 9,726,251 B2 | 8/2017 | Nagasawa et al. | |
| 9,772,002 B2 | 9/2017 | Ueki et al. | |
| 9,878,604 B2 | 1/2018 | Furusawa et al. | |
| 10,030,738 B2 | 7/2018 | Ueki et al. | |
| 10,422,404 B2 | 9/2019 | Oniwa | |
| 10,436,281 B2 | 10/2019 | Kim | |
| 10,584,761 B2 | 3/2020 | Fourman | |
| 10,589,615 B2 | 3/2020 | Chern et al. | |
| 10,781,881 B2 | 9/2020 | Ishikawa | |
| 10,989,269 B2 | 4/2021 | Kojima | |
| 11,241,949 B2 | 2/2022 | Beckmann et al. | |
| 11,428,290 B2 | 8/2022 | Ueki et al. | |
| 11,959,527 B2 * | 4/2024 | Satake | F16F 13/105 |
| 2002/0043748 A1 | 4/2002 | Meyer | |
| 2003/0030202 A1 | 2/2003 | Thomazeau et al. | |
| 2003/0038414 A1 | 2/2003 | Pizanti et al. | |
| 2003/0085498 A1 | 5/2003 | Reh et al. | |
| 2005/0127585 A1 * | 6/2005 | Maeno | F16F 13/264 267/140.11 |
| 2005/0206056 A1 | 9/2005 | Maeno et al. | |
| 2008/0290573 A1 | 11/2008 | Katayama et al. | |
| 2009/0140476 A1 | 6/2009 | Michiyama et al. | |
| 2009/0140477 A1 | 6/2009 | Michiyama | |
| 2009/0243171 A1 | 10/2009 | Nanno et al. | |
| 2009/0283945 A1 | 11/2009 | Kojima et al. | |
| 2010/0072683 A1 | 3/2010 | Saito et al. | |
| 2010/0102495 A1 | 4/2010 | Okumura et al. | |
| 2013/0069289 A1 | 3/2013 | Ishikawa et al. | |
| 2013/0154171 A1 | 6/2013 | Nishi et al. | |
| 2014/0327199 A1 | 11/2014 | Kanaya | |
| 2015/0028530 A1 | 1/2015 | Kanaya et al. | |
| 2015/0330476 A1 | 11/2015 | Satori et al. | |
| 2015/0337919 A1 | 11/2015 | Kojima | |
| 2016/0053844 A1 | 2/2016 | Nagasawa et al. | |
| 2016/0053845 A1 | 2/2016 | Ueki et al. | |
| 2016/0053846 A1 | 2/2016 | Nagasawa et al. | |
| 2016/0223048 A1 * | 8/2016 | Kojima | B60K 5/1208 |
| 2017/0023089 A1 | 1/2017 | Ueki | |
| 2017/0030428 A1 | 2/2017 | Ueki | |
| 2017/0089420 A1 | 3/2017 | Kadowaki et al. | |
| 2017/0335920 A1 | 11/2017 | Kanaya et al. | |
| 2018/0051769 A1 | 2/2018 | Kim | |
| 2018/0073591 A1 | 3/2018 | Nagasawa et al. | |
| 2019/0017567 A1 | 1/2019 | Kim | |
| 2019/0061509 A1 | 2/2019 | Kim | |
| 2019/0092155 A1 | 3/2019 | Inoue et al. | |
| 2019/0128364 A1 | 5/2019 | Kim | |
| 2020/0049224 A1 | 2/2020 | Ueki et al. | |
| 2020/0400210 A1 | 12/2020 | Ueki et al. | |
| 2021/0239180 A1 | 8/2021 | Satake et al. | |
| 2022/0373058 A1 | 11/2022 | Mikoshiba et al. | |
| 2022/0397177 A1 | 12/2022 | Satake et al. | |
| 2022/0403912 A1 * | 12/2022 | Mikoshiba | B60K 5/1208 |

FOREIGN PATENT DOCUMENTS

| | | |
|---|---|---|
| CN | 102725558 A | 10/2012 |
| CN | 103363013 A | 10/2013 |
| CN | 106574682 A | 4/2017 |
| CN | 106641087 A | 5/2017 |
| CN | 106662195 A | 5/2017 |
| CN | 108980261 A | 12/2018 |
| CN | 109690127 A | 4/2019 |
| CN | 110192045 A | 8/2019 |
| CN | 112074672 A | 12/2020 |
| DE | 102016101203 A1 | 7/2017 |
| EP | 1028268 A2 | 8/2000 |
| EP | 1283377 A1 | 2/2003 |
| FR | 2604231 A1 | 3/1988 |
| GB | 2282430 A | 4/1995 |
| JP | 01-193426 A | 8/1989 |
| JP | H0522890 U | 3/1993 |
| JP | H084823 A | 1/1996 |
| JP | 2002155984 A | 5/2002 |
| JP | 2002295571 A | 10/2002 |
| JP | 2002-327789 A | 11/2002 |
| JP | 2003130125 A | 5/2003 |
| JP | 2006200590 A | 8/2006 |
| JP | 2007182930 A | 7/2007 |
| JP | 2007218420 A | 8/2007 |
| JP | 2009-243543 A | 10/2009 |
| JP | 2010-031989 A | 2/2010 |
| JP | 2012172736 A | 9/2012 |
| JP | 2013032828 A | 2/2013 |
| JP | 2013-231454 A | 11/2013 |
| JP | 2013228003 A | 11/2013 |
| JP | 2013228004 A | 11/2013 |
| JP | 5642241 B1 | 12/2014 |
| JP | 2015059655 A | 3/2015 |
| JP | 2021076163 A | 5/2021 |
| JP | 2021076164 A | 5/2021 |
| JP | 2021076165 A | 5/2021 |
| JP | 2021076166 A | 5/2021 |
| JP | 2021076169 A | 5/2021 |
| JP | 2021076170 A | 5/2021 |
| JP | 2021076171 A | 5/2021 |
| JP | 2021076172 A | 5/2021 |
| JP | 2021076173 A | 5/2021 |
| WO | WO-2018198444 A1 * | 11/2018 ......... B60K 5/1208 |
| WO | 2019/216403 A1 | 11/2019 |

OTHER PUBLICATIONS

Apr. 25, 2023, Office Action issued by the United States Patent and Trademark Office in the U.S. Appl. No. 17/050,868.

Aug. 27, 2021, search result of Office Action issued by the China National Intellectual Property Administration in the corresponding Chinese Patent Application No. 201980030454.4.

Dec. 1, 2021, search result of the Extended European Search Report issued by the European Patent Office in the corresponding European Patent Application No. 19799394.2.

Dec. 28, 2020, International Search Report issued in the International Patent Application No. PCT/JP2020/041719.

Dec. 8, 2020, International Search Report issued in the International Patent Application No. PCT/JP2020/041370.

Dec. 8, 2020, International Search Report issued in the International Patent Application No. PCT/JP2020/041609.

Dec. 8, 2020, International Search Report issued in the International Patent Application No. PCT/JP2020/041665.

(56) References Cited

OTHER PUBLICATIONS

Jul. 23, 2019, International Search Report issued in the International Patent Application No. PCT/JP2019/018695.
May 10, 2022, International Preliminary Report on Patentability issued in the International Patent Application No. PCT/JP2020/038572.
May 10, 2022, International Preliminary Report on Patentability issued in the International Patent Application No. PCT/JP2020/041370.
May 10, 2022, International Preliminary Report on Patentability issued in the International Patent Application No. PCT/JP2020/041609.
May 10, 2022, International Preliminary Report on Patentability issued in the International Patent Application No. PCT/JP2020/041665.
May 10, 2022, International Preliminary Report on Patentability issued in the International Patent Application No. PCT/JP2020/041719.
Nov. 10, 2020, International Preliminary Report on Patentability issued in the International Patent Application No. PCT/JP2019/018695.
May 25, 2024, search result of Office Action issued by the China National Intellectual Property Administration in the corresponding Chinese Patent Application No. 202080076453.6.
May 30, 2024, search result of Office Action issued by the China National Intellectual Property Administration in the related Chinese Patent Application No. 202080075597.X.
May 30, 2024, search result of Office Action issued by the China National Intellectual Property Administration in the related Chinese Patent Application No. 202080075442.6.
Jul. 12, 2024, search result of Office Action issued by the China National Intellectual Property Administration in the corresponding Chinese Patent Application No. 202080076453.6.
Sep. 10, 2024, search result of Office Action issued by the China National Intellectual Property Administration in the related Chinese Patent Application No. 202080075597.X.

* cited by examiner

VIBRATION-DAMPING DEVICE

CROSS REFERENCE TO RELATED APPLICATIONS

This application is a National Stage of International Application No. PCT/JP2020/038572, filed Oct. 13, 2020, claiming priority to Japanese Patent Application No. 2019-202583, filed Nov. 7, 2019, the contents of all of which are incorporated herein by reference in their entirety.

TECHNICAL FIELD

The present invention relates to a vibration-damping device that is applied to, for example, an automobile, an industrial machine, or the like, and absorbs and dampens the vibration of a vibration-generating portion of an engine or the like thereof.

BACKGROUND ART

From the related art, as this type of vibration-damping device, a configuration has been known which includes a tubular first mounting member connected to any one of a vibration-generating portion and a vibration-receiving portion, and a second mounting member connected to the other of the vibration-generating portion and the vibration-receiving portion, an elastic body which elastically connects both the first tubular first mounting member and the second mounting member, a partition member that partitions a liquid chamber inside the first mounting member in which a liquid is sealed into a main liquid chamber that has the elastic body in a part of a partition wall thereof and an auxiliary liquid chamber, and a movable member that is accommodated in an accommodation chamber provided in the partition member to be deformable or displaceable, and in which the partition member has an orifice passage through which the main liquid chamber and the auxiliary liquid chamber communicate with each other, a plurality of first communication holes through which the main liquid chamber and the accommodation chamber communicate with each other and a second communication hole through which the auxiliary liquid chamber and the accommodation chamber communicate with each other.

In this vibration-damping device, when an idle vibration with a relatively high frequency among low-frequency vibrations with a frequency of less than 200 Hz is input in an axial direction, by making the liquid in the liquid chamber flow through the first communication hole and the second communication hole, while deforming or displacing the movable member in the accommodation chamber, the idle vibration is dampened and absorbed, and when a shake vibration with a relatively low frequency is input in the axial direction, by making the liquid in the liquid chamber flow through the orifice passage, the shake vibration is dampened and absorbed.

RELATED ART DOCUMENTS

Patent Documents

[Patent Document 1]

Japanese Unexamined Patent Application, First Publication No. 2002-327789

SUMMARY OF INVENTION

Problem to be Solved by the Invention

However, in the vibration-damping device of the related art, it was not possible to dampen and absorb medium-frequency vibration with a frequency of 200 Hz to 1000 Hz.

The present invention has been made in view of the above circumstances, and an object of the present invention is to provide a vibration-damping device capable of dampening and absorbing medium frequency vibration.

Means for Solving the Problem

A vibration-damping device according to one aspect of the present invention includes a first mounting member that has a tubular shape and is connected to any one of a vibration-generating portion and a vibration-receiving portion, and a second mounting member connected to the other of the vibration-generating portion and the vibration-receiving portion; an elastic body which elastically connects both the first mounting member and the second mounting member; a partition member which partitions a liquid chamber in which a liquid is sealed in the first mounting member into a main liquid chamber having the elastic body in a part of a partition wall of the main liquid chamber and an auxiliary liquid chamber, in an axial direction along a central axis of the first mounting member; and a movable member which is accommodated in an accommodation chamber, the accommodation chamber being provided in the partition member to be deformable or displaceable. The partition member includes an orifice passage through which the main liquid chamber and the auxiliary liquid chamber communicate with each other, a plurality of first communication holes through which the main liquid chamber and the accommodation chamber communicate with each other, and a second communication hole through which the auxiliary liquid chamber and the accommodation chamber communicate with each other. In the partition member, a tubular member which protrudes in the axial direction toward the elastic body is disposed on a first wall surface in which the first communication hole opens and which forms a part of an inner surface of the main liquid chamber. The plurality of first communication holes open in both an inner portion located on an inner side than the tubular member and an outer portion located on an outer side than the tubular member of the first wall surface. A part of the first communication hole and a part of the second communication hole face each other in the axial direction via the movable member.

Effect of Invention

According to the present invention, medium frequency vibration can be dampened and absorbed.

EMBODIMENTS FOR CARRYING OUT THE INVENTION

Hereinafter, embodiments of the vibration-damping device according to the present invention will be described on the basis of FIGS. 1 and 2.

Figure 1:
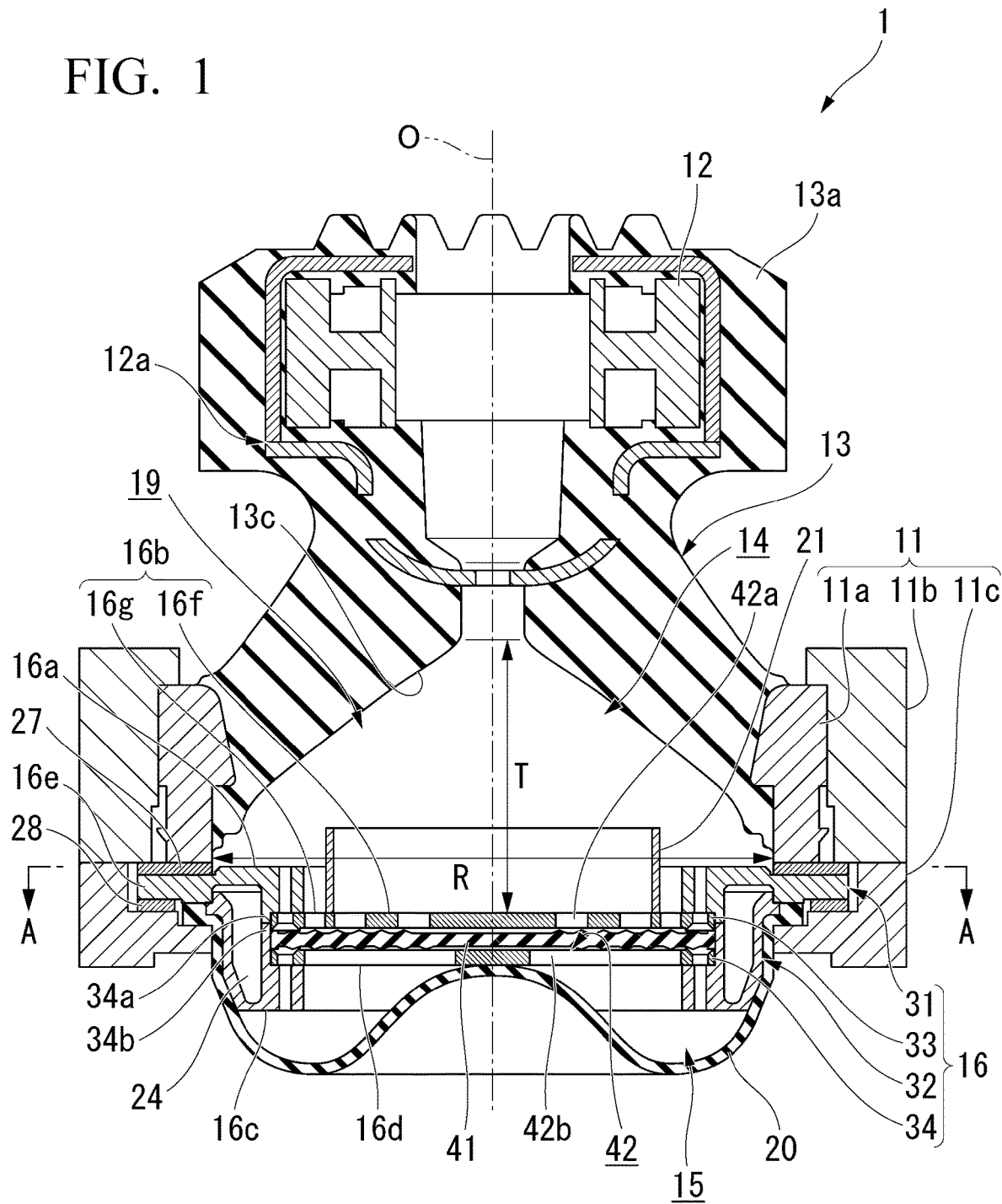
FIG. 1 is a vertical sectional view of a vibration-damping device according to an embodiment of the present invention.

As shown in FIG. 1, a vibration-damping device 1 is a liquid-sealed type vibration-damping device which includes a first mounting member 11 that has a tubular shape and is connected to any one of a vibration-generating portion and a vibration-receiving portion, a second mounting member 12 connected to the other of the vibration-generating portion and the vibration-receiving portion, an elastic body 13 which elastically connects the first mounting member 11 and the second mounting member 12 to each other, a partition member 16 that partitions a liquid chamber 19 in which a liquid is sealed in the first mounting member 11 into a main liquid chamber 14 having the elastic body 13 in a part of a partition wall of the main liquid chamber and an auxiliary liquid chamber 15, and a movable member 41 that is accommodated in an accommodation chamber 42 provided in the partition member 16 to be deformable or displaceable.

Hereinafter, a direction along a central axis O of the first mounting member 11 is referred to as an axial direction. Further, the second mounting member 12 side in the axial direction is referred to as an upper side, and the partition member 16 side is referred to as a lower side. Further, in a plan view of the vibration-damping device 1 in the axial direction, a direction that intersects the central axis O is referred to as a radial direction, and a direction around the central axis O is referred to as a circumferential direction.

The first mounting member 11, the second mounting member 12, and the elastic body 13 each have a circular shape or an annular shape in the plan view, and are disposed coaxially with the central axis O.

When the vibration-damping device 1 is mounted on an automobile, for example, the second mounting member 12 is connected to an engine or the like that is the vibration-generating portion, and the first mounting member 11 is connected to a vehicle body that is the vibration-receiving portion. As a result, the vibration of the engine or the like is suppressed from being transferred to the vehicle body. The first mounting member 11 may be connected to the vibration-generating portion, and the second mounting member 12 may be connected to the vibration-receiving portion.

The first mounting member 11 includes an inner cylinder portion 11a, an outer cylinder portion 11b, and a lower support portion 11c.

The inner cylinder portion 11a is fitted into the outer cylinder portion 11b. The lower support portion 11c is formed in an annular shape. A lower end opening edge of the outer cylinder portion 11b is placed on an upper surface of an outer peripheral portion of the lower support portion 11c. The first mounting member 11 is formed in a cylindrical shape as a whole. The first mounting member 11 is connected to a vehicle body or the like as the vibration-receiving portion via a bracket (not shown).

The second mounting member 12 is located on the inner side in the radial direction than and above the first mounting member 11. The outer diameter of the second mounting member 12 is smaller than the inner diameter of the first mounting member 11. By fitting a mounting bracket (not shown) inside the second mounting member 12, the second mounting member 12 is connected to the engine or the like that is the vibration-generating portion via the mounting bracket.

Relative positions of the first mounting member 11 and the second mounting member 12 are not limited to the examples shown in the drawings, and may be appropriately changed. Further, the outer diameter of the second mounting member 12 may be set to be equal to or greater than the inner diameter of the first mounting member 11.

The elastic body 13 is formed in a cylindrical shape extending in the axial direction. The diameter of the elastic body 13 increases from the upper side to the lower side.

The first mounting member 11 and the second mounting member 12 are separately connected to both end portions in the axial direction of the elastic body 13. The second mounting member 12 is connected to an upper end portion of the elastic body 13, and the first mounting member 11 is connected to a lower end portion of the elastic body 13. The elastic body 13 closes an upper end opening portion of the first mounting member 11. The lower end portion of the elastic body 13 is connected to the inner peripheral surface of the inner cylinder portion 11a of the first mounting member 11. The upper end portion of the elastic body 13 is connected to the lower surface of the second mounting member 12. The elastic body 13 is formed of a rubber material or the like, and is vulcanized and adhered to the first mounting member 11 and the second mounting member 12. A thickness of the elastic body 13 becomes thinner from the upper side to the lower side. The elastic body 13 may be formed of, for example, a synthetic resin material.

A stopper rubber 13a that covers the outer peripheral surface and the upper surface of the second mounting member 12 is integrally formed at the upper end portion of the elastic body 13. An outer shell body 12a that surrounds the second mounting member 12 is embedded in the elastic body 13 and the stopper rubber 13a.

A diaphragm 20 is made of an elastic material such as rubber or a soft resin, and is formed in a bottomed cylindrical shape. When an upper end portion of the diaphragm 20 is sandwiched between the inner peripheral portion of the lower support portion 11c of the first mounting member 11 and the outer peripheral portion of the partition member 16, liquid-tightness inside the diaphragm 20 is ensured, and the lower end opening portion of the first mounting member 11 is closed.

In the shown example, the bottom portion of the diaphragm 20 has a shape which is deep in the outer peripheral part and shallow in the central part. However, as the shape of the diaphragm 20, various conventionally known shapes other than such a shape of the shown example may be adopted.

Since the diaphragm 20 closes the lower end opening portion of the first mounting member 11, and as described above, the elastic body 13 closes the upper end opening portion of the first mounting member 11, the interior of the first mounting member 11 becomes a liquid chamber 19 sealed in a liquid-tight manner. A liquid is sealed (filled) in the liquid chamber 19. Examples of the liquid include ethylene glycol, water, silicone oil and the like.

The liquid chamber 19 is partitioned into a main liquid chamber 14 and an auxiliary liquid chamber 15 in the axial direction by a partition member 16. The main liquid chamber 14 is a space which has an inner peripheral surface 13c of the elastic body 13 in a part of the wall surface thereof and is surrounded by the elastic body 13 and the partition member 16, and an internal volume thereof changes due to the deformation of the elastic body 13. The auxiliary liquid chamber 15 is a space surrounded by the diaphragm 20 and the partition member 16, and the internal volume changes due to the deformation of the diaphragm 20. The vibration-damping device 1 having such a configuration is a compression type device that is used with the main liquid chamber 14 located on the upper side of the vibration-damping device 1 in a vertical direction and the auxiliary liquid chamber 15 located on the lower side of the vibration-damping device 1 in the vertical direction attached.

The partition member 16 is formed with a plurality of first communication holes 42a through which the main liquid chamber 14 and the accommodation chamber 42 communicate with each other, and a second communication hole 42b through which the auxiliary liquid chamber 15 and the accommodation chamber 42 communicate with each other. A plurality of second communication holes 42b are formed in the partition member 16. Flow path lengths of the first communication hole 42a and the second communication hole 42b face each other in the axial direction are the same as each other. One second communication hole 42b may be formed in the partition member 16.

Here, in the partition member 16, an upper wall surface forming a part of the inner surface of the main liquid chamber 14 and a lower wall surface forming a part of the inner surface of the auxiliary liquid chamber 15 each have a circular shape disposed coaxially with the central axis O when viewed in the axial direction. The diameters of the upper wall surface and the lower wall surface of the partition member 16 are equal to each other. The upper wall surface of the partition member 16 faces the inner peripheral surface 13c of the elastic body 13 in the axial direction, and the lower wall surface of the partition member 16 faces the inner surface of the diaphragm 20 in the axial direction.

In the shown example, a recess is formed on the upper wall surface of the partition member 16 over an entire area thereof except the outer peripheral edge portion 16a. A plurality of first communication holes 42a are opened in a bottom surface (hereinafter referred to as a first wall surface) 16b of the recess over the entire area of the first wall surface 16b. A recess is formed on the lower wall surface of the partition member 16 over the entire area thereof except the outer peripheral edge portion 16c. A plurality of second communication holes 42b are opened in a bottom surface (hereinafter referred to as a second wall surface) 16d of the recess over the entire area of the second wall surface 16d. Each recess of the upper wall surface and the lower wall surface has a circular shape disposed coaxially with the central axis O when viewed in the axial direction, and the sizes such as the inner diameter and the depth of recesses are the same as each other.

The accommodation chamber 42 is formed in a portion of the partition member 16 located between the first wall surface 16b and the second wall surface 16d in the axial direction. The accommodation chamber 42 has a circular shape disposed coaxially with the central axis O when viewed in the axial direction. The diameter of the accommodation chamber 42 is greater than the diameters of the first wall surface 16b and the second wall surface 16d.

The movable member 41 is formed in a plate shape with front and back surfaces facing in the axial direction. The movable member 41 has a circular shape disposed coaxially with the central axis O when viewed in the axial direction. The movable member 41 is made of, for example, an elastic material such as rubber or a soft resin.

The partition member 16 is formed with an orifice passage 24 through which the main liquid chamber 14 and the auxiliary liquid chamber 15 communicate with each other. The orifice passage 24 is formed in a portion of the partition member 16 located between the outer peripheral edge portion 16a of the upper wall surface and the outer peripheral edge portion 16c of the lower wall surface in the axial direction. An upper end of the orifice passage 24 is located above the first wall surface 16b, and a lower end of the orifice passage 24 is located below the second wall surface 16d. A cross-sectional shape of a flow path of the orifice passage 24 is a rectangular shape that is long in the axial direction. A resonance frequency of the orifice passage 24 is lower than the resonance frequency when the liquid moves between the main liquid chamber 14 and the auxiliary liquid chamber 15 through the first communication hole 42a and the second communication hole 42b.

Figure 2:
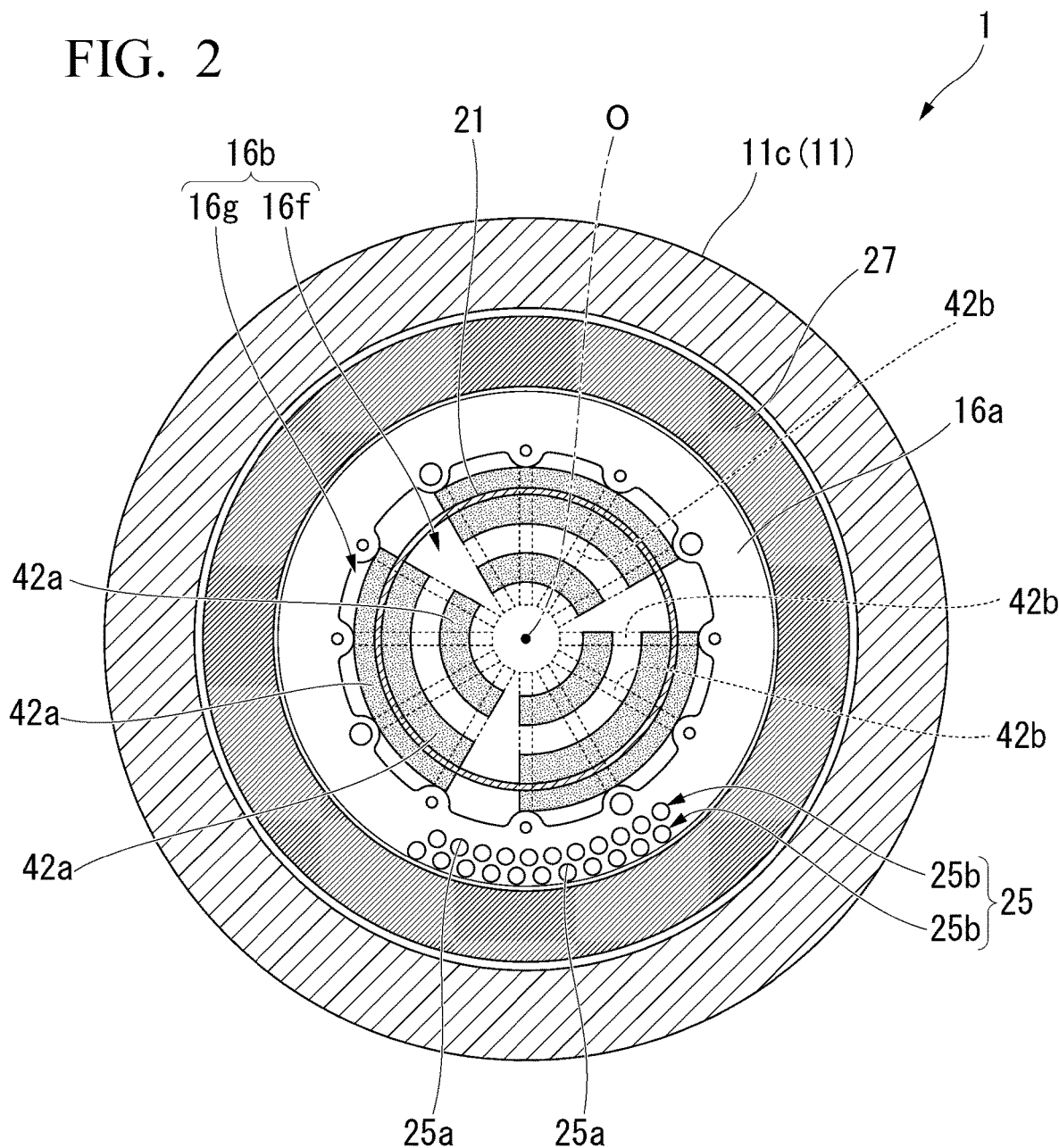
FIG. 2 is a cross-sectional view along a line A-A of the vibration-damping device shown in FIG. 1.

As shown in FIG. 2, an opening portion 25 on the main liquid chamber 14 side of the orifice passage 24 is formed in the outer peripheral edge portion 16a of the upper wall surface of the partition member 16. The opening portion 25 is configured such that a plurality of hole rows 25b, in which a plurality of through holes 25a are disposed at intervals in the circumferential direction, are disposed at different positions in the radial direction and the circumferential direction. Two hole rows 25b are disposed in the outer peripheral edge portion 16a of the upper wall surface of the partition member 16. The amount of difference between hole rows 25b in the circumferential direction and the amount of difference between hole rows 25b in the radial direction are each equal to the inner diameter of the through hole 25a.

The opening portion on the auxiliary liquid chamber 15 side of the orifice passage 24 is formed in the outer peripheral edge portion 16c of the lower wall surface of the partition member 16, and is one opening whose opening area is larger than an opening area of the opening portion 25 on the main liquid chamber 14 side of the orifice passage 24, that is, the total opening areas of the plurality of through holes 25a. The opening portion 25 on the main liquid chamber 14 side of the orifice passage 24 and the opening portion on the auxiliary liquid chamber 15 side of the orifice passage 24 are located on the outer side in the radial direction than the first communication hole 42a and the second communication hole 42b.

A flange portion 16e is formed at the upper end portion of the partition member 16 to protrude outward in the radial direction and extend continuously over the entire circumference thereof. An upper surface of the flange portion 16e abuts the lower end opening edges of the inner cylinder portion 11a and the outer cylinder portion 11b of the first mounting member 11 via an annular upper sealing material 27. A lower surface of the flange portion 16e abuts the upper surface of the inner peripheral portion of the lower support portion 11c of the first mounting member 11, via an upper end opening edge of the diaphragm 20 and an annular lower sealing material 28 that surrounds the upper end opening edge of the diaphragm 20 from outside in the radial direction.

The partition member 16 includes an upper cylinder 31 and a lower cylinder 32 disposed to abut against each other in the axial direction, an upper wall 33 that closes a lower end opening portion of the upper cylinder 31, and a lower wall 34 that closes an upper end opening portion of the lower cylinder 32. The partition member 16 may be integrally formed.

The upper end opening edge of the upper cylinder 31 is the outer peripheral edge portion 16a of the upper wall surface of the partition member 16 described above. A flange portion 16e is formed at the upper end portion of the upper cylinder 31. At the lower end opening edge of the upper cylinder 31, a peripheral groove that is recessed upward and opens outward in the radial direction is formed in a portion located on the outer side in the radial direction than the inner peripheral portion.

The upper wall 33 is fixed to the inner peripheral portion of the lower end opening edge of the upper cylinder 31. A first communication hole 42a is formed in the upper wall 33.

At the upper end opening edge of the lower cylinder 32, a peripheral groove that is recessed downward is formed in an intermediate portion in the radial direction of the upper end opening edge of the lower cylinder 32 that faces the peripheral groove of the upper cylinder 31 in the axial direction. The orifice passage 24 is defined by this peripheral groove (the peripheral groove of the lower cylinder 32) and the peripheral groove of the upper cylinder 31. At the upper end opening edge of the lower cylinder 32, the outer peripheral edge portion located on the outer side than the peripheral groove abuts the lower surface of the flange portion 16e of the upper cylinder 31. The lower cylinder 32 is fitted into the upper end portion of the diaphragm 20, and the upper end portion of the diaphragm 20 is fitted into the lower support portion 11c of the first mounting member 11. As a result, the upper end portion of the diaphragm 20 is sandwiched in the radial direction between the outer peripheral surface of the lower cylinder 32 and the inner peripheral surface of the lower support portion 11c.

The lower wall 34 is fixed to the inner peripheral portion of the upper end opening edge of the lower cylinder 32. A second communication hole 42b is formed in the lower wall 34.

Abutting protrusions 34a and 34b are formed on at least one of the inner peripheral portion at the lower end opening edge of the upper cylinder 31 and the inner peripheral portion at the upper end opening edge of the lower cylinder 32 to protrude toward and abut against the other. In the shown example, the abutting protrusions 34a and 34b are formed on both the inner peripheral portion at the lower end opening edge of the upper cylinder 31 and the inner peripheral portion at the upper end opening edge of the lower cylinder 32. The abutting protrusions 34a and 34b are formed in an annular shape coaxially with the central axis O, and the upper wall 33 and the lower wall 34 are disposed on the inner side than the abutting protrusions 34a and 34b in the radial direction and disposed with a gap in the axial direction. The accommodation chamber 42 is defined by the lower surface of the upper wall 33, the upper surface of the lower wall 34, and the inner peripheral surfaces of the abutting protrusions 34a and 34b.

Further, in the present embodiment, in the partition member 16, a tubular member 21 which protrudes in the axial direction toward the elastic body 13 is disposed on the first wall surface 16b in which the first communication holes 42a open and which forms a part of the inner surface of the main liquid chamber 14.

The tubular member 21 is formed in a cylindrical shape and is disposed coaxially with the central axis O. The tubular member 21 extends straight in the axial direction. A length in the axial direction of the tubular member 21 is 20% or more of a maximum axial height T in the axial direction of the main liquid chamber 14. In the shown example, the maximum axial height T of the main liquid chamber 14 is the distance in the axial direction between the upper end portion of the inner peripheral surface 13c of the elastic body 13 and the first wall surface 16b, the inner peripheral surface 13c of the elastic body 13 extending inward in the radial direction from the lower side to the upper side. The length in the axial direction of the tubular member 21 is set such that the upper end portion of the tubular member 21 does not abut the inner peripheral surface 13c of the elastic body 13, when a static load in the axial direction is applied to or a vibration in the axial direction is input to the vibration-damping device 1.

As described above, the inner peripheral surface 13c of the elastic body 13 is a portion which extends inward in the radial direction from the lower side to the upper side. Further, as in the shown example, when the upper end portion of the inner surface of the elastic body 13 defining the main liquid chamber 14 is provided with a recess that is recessed upward, the upper end portion of the inner peripheral surface 13c of the elastic body 13 is an opening peripheral edge portion of a recess on the inner surface of the elastic body 13.

The upper part of the tubular member 21 protrudes upward from the upper end opening portion of the recess formed on the upper wall surface of the partition member 16. The outer peripheral surface of the upper part of the tubular member 21 faces the lower end portion of the inner peripheral surface of the inner cylinder portion 11a of the first mounting member 11 and the lower end portion of the inner peripheral surface 13c of the elastic body 13 with a gap in the radial direction. The protruding length of the upper part of the tubular member 21 from the upper end opening portion of the recess is shorter than the depth of the recess. Further, the protruding length is shorter than the distance in the axial direction between the upper end opening edge of the tubular member 21 and the portion of the inner peripheral surface 13c of the elastic body 13 where the upper end opening edge of the tubular member 21 faces in the axial direction. In the axial direction, the upper end opening edge of the tubular member 21 faces the portion of the inner peripheral surface 13c of the elastic body 13, the inner peripheral surface 13c of the elastic body 13 extending inward in the radial direction from the lower side to the upper side, and the portion of the inner peripheral surface 13c of the elastic body 13 being positioned on the lower side than the central part in the extending direction of the inner peripheral surface 13c in a vertical cross-sectional view along the axial direction.

The radius of the inner peripheral surface of the tubular member 21 is larger than the interval in the radial direction between the outer peripheral surface of the tubular member 21 and the inner peripheral surface of the recess formed on the upper wall surface of the partition member 16. An inner diameter of the tubular member 21 is more than half of a maximum inner diameter R of the main liquid chamber 14. In the shown example, the maximum inner diameter R of the main liquid chamber 14 is an inner diameter of the lower end portion of the inner cylinder portion 11a of the first mounting member 11. In the first wall surface 16b, a flat area of a portion (hereinafter referred to as an inner portion) 16f located on the inner side than the tubular member 21 is greater than a flat area of a portion (hereinafter referred to as an outer portion) 16g of the portion located on the outer side than the tubular member 21.

The plurality of first communication holes 42a open in both the inner portion 16f and the outer portion 16g of the first wall surface 16b. All of the plurality of first communication holes 42a face the upper surface of the movable member 41. All of the plurality of second communication holes 42b face the lower surface of the movable member 41.

The tubular member 21 is connected to a portion of the first wall surface 16b located between adjacent first communication holes 42a, and is disposed as not to overlap the first communication hole 42a.

Further, in the present embodiment, a part of the first communication hole 42a and a part of the second communication hole 42b face each other in the axial direction via the movable member 41. All of the plurality of first communication holes 42a face the second communication hole 42b in the axial direction via the movable member 41, and all of the plurality of second communication holes 42b face the first communication hole 42a in the axial direction via the movable member 41. When viewed in the axial direction, the shapes of the first communication hole 42a and the second communication hole 42b are different from each other.

Further, in FIG. 2, the first communication hole 42a is provided with dot hatching.

The first communication hole 42a is a curved elongated hole extending along the tubular member 21 when viewed in the axial direction. The first communication hole 42a has a curved rectangular shape extending along the circumferential direction. A peripheral edge of the first communication hole 42a in the circumferential direction is located on a straight line that extends in the radial direction and passes through the central axis O when viewed in the axial direction.

A plurality of first communication holes 42a are provided on the first wall surface 16b at equal intervals in the circumferential direction. The interval between the first communication holes 42a adjacent to each other in the circumferential direction is narrower than the size of the first communication holes 42a in the circumferential direction. The cross-sectional area of the flow paths of the first communication holes 42a adjacent to each other in the circumferential direction are the same as each other.

A plurality of first communication holes 42a are provided at intervals in the radial direction. The peripheral edges in the circumferential direction of the first communication holes 42a adjacent to each other in the radial direction are located on the same straight line passing through the central axis O when viewed in the axial direction. In the plurality of first communication holes 42a opened in the first wall surface 16b, the first communication hole 42a located on the outer side in the radial direction has a longer length in the circumferential direction.

In the inner portion 16f, two rows of a plurality of first communication holes 42a provided at equal intervals in the circumferential direction are provided at an interval in the radial direction. In the inner portion 16f, the interval in the radial direction between the first communication holes 42a adjacent to each other in the radial direction is the same as the width in the radial direction of the first communication holes 42a. The outer portion 16g is provided with one row of a plurality of first communication holes 42a provided at equal intervals in the circumferential direction.

Further, the inner portion 16f may be provided with only one row of a plurality of first communication holes 42a provided at intervals in the circumferential direction. A plurality of first communication holes 42a may be provided in the outer portion 16g at intervals in the radial direction.

The widths in the radial direction of the plurality of first communication holes 42a provided in the inner portion 16f are the same as each other. The width in the radial direction of the first communication hole 42a provided in the inner portion 16f is wider than the width in the radial direction of the first communication hole 42a provided in the outer portion 16g.

Further, the width in the radial direction of the first communication hole 42a provided in the inner portion 16f may be equal to or less than the width in the radial direction of the first communication hole 42a provided in the outer portion 16g.

The first communication hole 42a provided in the inner portion 16f is a curved elongated hole extending along the inner peripheral surface of the tubular member 21 when viewed in the axial direction. The first communication hole 42a provided in the outer portion 16g is a curved elongated hole extending along the outer peripheral surface of the tubular member 21 when viewed in the axial direction.

Further, the shapes of the inner peripheral surface and the outer peripheral surface of the tubular member 21 as viewed in the axial direction may be different from each other.

When viewed in the axial direction, an inner end edge in the radial direction of the first communication hole 42a provided in the outer portion 16g coincides with the outer peripheral surface of the tubular member 21. Among the plurality of first communication holes 42a provided in the inner portion 16f, an outer end edge in the radial direction of the first communication hole 42a located on the outermost side in the radial direction coincides with the inner peripheral surface of the tubular member 21 when viewed in the axial direction.

The first communication hole 42a provided in the outer portion 16g may be separated outward in the radial direction from the outer peripheral surface of the tubular member 21. The first communication hole 42a located on the outermost side in the radial direction among the plurality of first communication holes 42a provided in the inner portion 16f may be separated inward in the radial direction from the inner peripheral surface of the tubular member 21.

The second communication hole 42b is an elongated hole extending in the radial direction. In the axial direction, the second communication hole 42b faces the plurality of first communication holes 42a adjacent to each other in the radial direction via the movable member 41. In the axial direction, the second communication hole 42b faces the plurality of first communication holes 42a which separately open in the inner portion 16f and the outer portion 16g, via the movable member 41.

That is, in the axial direction, one second communication hole 42b faces a plurality of first communication holes 42a (three in the shown example) adjacent to each other in the radial direction via the movable member 41.

The outer end edge in the radial direction of the second communication hole 42b is located at the same position in the radial direction as the outer end edge in the radial direction of the first communication hole 42a provided in the outer portion 16g. The inner end edge in the radial direction of the second communication hole 42b is located on the inner side in the radial direction than the inner end edge in the radial direction of the first communication hole 42a located on the innermost side in the radial direction among the plurality of first communication holes 42a provided in the inner portion 16f.

The second communication hole 42b may extend intermittently in the radial direction. For example, the inner end edge in the radial direction of the second communication hole 42b may be located at the same position in the radial direction as the inner end edge in the radial direction of the first communication hole 42a located on the innermost side in the radial direction among the plurality of first communication holes 42a provided in the inner portion 16f.

A plurality of second communication holes 42b are provided on the second wall surface 16d at equal intervals in the circumferential direction. One first communication hole 42a faces a plurality of second communication holes 42b (four in the shown example) in the axial direction via the movable member 41. Among the plurality of second communication holes 42b facing the first communication hole 42a in the axial direction, the outer end edge in the circumferential direction of the second communication hole 42b located on the outermost side in the circumferential direction, and the end edge in the circumferential direction of the first communication hole 42a is located on the same straight line passing through the central axis O when viewed in the axial direction.

The cross-sectional areas of flow paths of the plurality of second communication holes 42b are the same as each other. The width in the circumferential direction of the second communication hole 42b is narrower than the width in the radial direction of the first communication hole 42a. The width in the circumferential direction of the second communication hole 42b may be equal to or greater than the width in the radial direction of the first communication hole 42a.

The sum of overlapping areas in which the first communication hole 42a opening in the outer portion 16g faces the second communication hole 42b in the axial direction via the movable member 41 is different from the sum of overlapping areas in which the first communication hole 42a opening in the inner portion 16f faces the second communication holes 42b in the axial direction via the movable member 41. In the shown example, the former thereof is smaller than the latter thereof.

Here, the thicknesses of the upper wall 33 and the lower wall 34 are the same over the entire region thereof, and a flow path length of the first communication hole 42a opening in the outer portion 16g is the same as a flow path length of the first communication hole 42a opening in the inner portion 16f. The flow path length of the first communication hole 42a opening in the outer portion 16g may be different from the flow path length of the first communication hole 42a opening in the inner portion 16f.

In the vibration-damping device 1 having such a configuration, when idle vibration having a relatively high frequency among low frequency vibrations is input in the axial direction, the liquid of the liquid chamber 19 flows through the first communication hole 42a and the second communication hole 42b while the movable member 41 is deformed or displaced in the accommodation chamber 42, and the vibration is dampened and absorbed. Further, when the shake vibration having a relatively low frequency among the low frequency vibrations is input in the axial direction, the liquid of the liquid chamber 19 flows through the orifice passage 24, and the vibration is dampened and absorbed.

As described above, with the vibration-damping device 1 according to the present embodiment, the tubular member 21 protruding toward the elastic body 13 is disposed on the first wall surface 16b of the partition member 16. Therefore, when the elastic body 13 is deformed in a secondary vibration mode in the vertical cross-sectional view along the axial direction due to the input of the medium frequency vibration in the axial direction, a node portion conventionally generated in the central part of the elastic body 13 (the central part of the elastic body 13 in the axial direction) is displaced toward the second mounting member 12, for example, due to the fact that the liquid between the inner peripheral surface of the main liquid chamber 14 and the outer peripheral surface of the upper part of the tubular member 21 becomes hard to flow. Further, in the elastic body 13, the portion located on the side closer to the first mounting member 11 than the node portion is more easily deformed, compared to the portion located on the side closer to the second mounting member 12 than the node portion. As a result, when the medium frequency vibration in the axial direction is input, the portion of the elastic body 13 located on the side closer to the first mounting member 11 than the node portion is positively deformed, the rigidity of the elastic body 13 can be apparently reduced, and the vibration can be dampened and absorbed.

Further, since the plurality of first communication holes 42a are open in both the inner portion 16f and the outer portion 16g of the first wall surface 16b, it is possible to dispose many first communication holes 42a in the first wall surface 16b, and, among low frequency vibrations, for example, idle vibration having a relatively high frequency can be reliably dampened and absorbed.

A part of the first communication hole 42a and a part of the second communication hole 42b face each other in the axial direction via the movable member 41. Therefore, by adjusting the overlapping area in which the first communication hole 42a and the second communication hole 42b face each other in the axial direction via the movable member 41 without adjusting the cross-sectional area of the flow paths of the first communication hole 42a and the second communication hole 42b, it is possible to tune the resonance frequency when vibration is input and the liquid moves between the main liquid chamber 14 and the auxiliary liquid chamber 15 through the first communication hole 42a and the second communication hole 42b. As a result, since it is not necessary to reduce the cross-sectional area of the flow path of the first communication hole 42a and the second communication hole 42b for tuning, for example, when the partition member 16 is formed by casting or injection molding, it is not necessary to make a pin for molding the first communication hole 42a and the second communication hole 42b thin, and it is possible to prevent the pin from becoming difficult to manufacture, such as a decrease in durability of the pin.

Since the shapes of the first communication hole 42a and the second communication hole 42b are different from each other when viewed in the axial direction, it is possible to easily adjust the overlapping area in which the first communication hole 42a and the second communication hole 42b face each other in the axial direction via the movable member 41.

Since the first communication hole 42a is a curved elongated hole extending along the tubular member 21 when viewed in the axial direction, for example, when the partition member 16 is formed by casting or injection molding, it is possible to secure the fluidity of the molten material inside the cavity, and prevent the mold structure from becoming complicated.

Since the second communication hole 42b is an elongated hole extending in the radial direction and faces the plurality of first communication holes 42a provided in the first wall surface 16b in the axial direction via the movable member 41, it is possible to easily secure an overlapping area in which the first communication hole 42a and the second communication hole 42b face each other in the axial direction via the movable member 41.

Further, since the length of the tubular member 21 in the axial direction is 20% or more of the maximum height T of the main liquid chamber 14 in the axial direction, it is possible to reliably dampen and absorb the medium frequency vibration in the axial direction.

Further, since the inner diameter of the tubular member 21 is more than half of the maximum inner diameter R of the main liquid chamber 14, it is possible to reliably dampen and absorb the medium frequency vibration in the axial direction.

The sum of the overlapping areas in which the first communication hole 42a opening in the outer portion 16g faces the second communication hole 42b in the axial direction via the movable member 41 is different from the sum of the overlapping areas in which the first communication holes 42a opening in the inner portion 16f faces the second communication holes 42b in the axial direction via the movable member 41. This makes it possible to adjust, for example, the flow state, such as the flow velocity, of the liquid between the inner peripheral surface of the main liquid chamber 14 and the outer peripheral surface of the tubular member 21, and easily adjust the position of the node portion.

The technical scope of the present invention is not limited to the above-described embodiment, and various changes can be made within the scope of the present invention.

For example, when viewed in the axial direction, the shapes and sizes of the first communication hole 42a and the second communication hole 42b may be the same as each other.

As the first communication hole 42a, for example, when viewed in the axial direction, a hole having a circular shape, an elongated hole extending in a direction intersecting the tubular member 21, or the like may be adopted.

As the second communication hole 42b, for example, when viewed in the axial direction, an elongated hole extending in a direction intersecting in the radial direction, a hole having a circular shape, or the like may be adopted.

At a plurality of places, one first communication hole 42a and one second communication hole 42b may face each other in the axial direction via the movable member 41.

A part of the plurality of first communication holes 42a may face the second communication hole 42b in the axial direction via the movable member 41, and a part of the plurality of second communication holes 42b may face the first communication hole 42a in the axial direction via the movable member 41.

A sum of overlapping areas in which the first communication hole 42a opening in the outer portion 16g faces the second communication hole 42b in the axial direction via the movable member 41 may be equal to or greater than the sum of overlapping areas in which the first communication hole 42a opening in the inner portion 16f faces the second communication hole 42b in the axial direction via the movable member 41.

Further, the size of the overlapping area in which the first communication hole 42a and the second communication hole 42b face each other in the axial direction via the movable member 41 may be different for each region along the circumferential direction. In this case, in a lateral direction intersecting the axial direction, depending on whether the vibration in the direction from the central axis O toward the region having the large overlapping area is input, or the vibration in the direction from the central axis O toward the region having the small overlapping area is input, the degree of liquid flow in the entire liquid chamber 19 can be made different, by, for example, changing the first communication hole 42a through which a relatively large amount of liquid flows among the plurality of first communication holes 42a. As a result, in the lateral direction, depending on whether the vibration in the direction from the central axis O toward the region having the large overlapping area is input, or the vibration in the direction from the central axis O toward the region having the small overlapping area is input, the spring of the vibration-damping device 1 can be different.

An interposed wall having a through hole formed in the axial direction may be provided between the first wall surface 16b and the movable member 41, and a part of the through hole of the interposed wall and a part of the first communication hole 42a may face each other in the axial direction. Further, an interposed wall having a through hole formed in the axial direction may be provided between the second wall surface 16d and the movable member 41, and a part of the through hole of the interposed wall and a part of the second communication hole 42b may face each other in the axial direction.

In these cases, it is possible to reliably eliminate the need to reduce the cross-sectional area of the flow path of each of the through hole of the interposed wall, the first communication hole 42a and the second communication hole 42b.

Further, although a configuration in which the tubular member 21 is connected to the first wall surface 16b not to overlap the first communication hole 42a is described above, the tubular member 21 may be connected to the first wall surface 16b to overlap the first communication hole 42a.

Further, although a configuration in which the elastic body 13 is formed in a tubular shape extending in the axial direction is described above, a configuration in which the elastic body 13 is formed in an annular plate shape having upper and lower surfaces may be adopted.

Further, although a recess is formed on the upper wall surface of the partition member 16, the recess may not be formed.

Further, although the compression type vibration-damping device 1 in which a positive pressure acts on the main liquid chamber 14 by the action of a supporting load has been described in the above embodiment, the present invention is also applicable to a suspension type vibration-damping device in which a negative pressure acts on the main liquid chamber 14 by the action of the supporting load, such that the main liquid chamber 14 is mounted to be located on the lower side in the vertical direction, and the auxiliary liquid chamber 15 is mounted to be located on the upper side in the vertical direction.

Further, the vibration-damping device 1 according to the present invention is applicable not limited to an engine mount of an automobile, and is also applicable to parts other than the engine mount. For example, the vibration-damping device 1 is also applicable to the mount of a generator mounted on a construction machine, and is also applicable to the mount of a machine installed in a factory or the like.

In addition, it is possible to appropriately replace the constituent elements in the above-described embodiment with well-known constituent elements within the scope of the present invention, and the above-described embodiments and modifications may be appropriately combined.

According to the above aspect of the present invention, the tubular member (21) protruding toward the elastic body (13) is disposed on the first wall surface (16b) of the partition member (16). Therefore, when the elastic body is deformed in the secondary vibration mode in the vertical cross-sectional view along the axial direction due to the input of the medium frequency vibration in the axial direction, the node portion conventionally generated in the central part of the elastic body is displaced toward the second mounting member (12), for example, due to the fact that the liquid between the inner peripheral surface of the main liquid chamber and the outer peripheral surface of the tubular member becomes hard to flow. Further, in the elastic body, the portion located on side closer to the first mounting member (11) than the node portion is more easily deformed, compared to the portion located on the side closer to the second mounting member than the node portion. As a result, when the medium frequency vibration in the axial direction is input, the portion of the elastic body located on the side closer to the first mounting member than the node portion is positively deformed, the rigidity of the elastic body can be apparently reduced, and the vibration can be dampened and absorbed.

Further, since the plurality of first communication holes (42a) are open in both the inner portion (16f) located on the inner side than the tubular member and the outer portion (16g) located on the outer side than the tubular member of the first wall surface, it is possible to dispose many first communication holes in the first wall surface, and among low frequency vibrations, for example, idle vibration having a relatively high frequency can be reliably dampened and absorbed.

A part of the first communication hole and a part of the second communication hole (42b) face each other in the axial direction via the movable member (41). Therefore, by adjusting the overlapping area in which the first communication hole and the second communication hole face each other in the axial direction via the movable member without adjusting the cross-sectional area of the flow paths of the first communication hole and the second communication hole, it is possible to tune the resonance frequency when vibration is input and the liquid moves between the main liquid chamber and the auxiliary liquid chamber through the first communication hole and the second communication hole. As a result, since it is not necessary to reduce the cross-sectional area of the flow path of the first communication hole and the second communication hole for tuning, for example, when the partition member is formed by casting or injection molding, it is not necessary to make a pin for molding the first communication hole and the second communication hole thin, and it is possible to prevent the pin from becoming difficult to manufacture, such as a decrease in durability of the pin.

In the above aspect, the shapes of the first communication hole and the second communication hole may be different from each other when viewed in the axial direction.

In this case, since the shapes of the first communication hole and the second communication hole are different from each other when viewed in the axial direction, it is possible to easily adjust the overlapping areas in which the first communication hole and the second communication hole face each other in the axial direction via the movable member.

In the above aspect, the first communication hole may be a curved elongated hole extending along the tubular member when viewed in the axial direction.

In this case, since the first communication hole is a curved elongated hole extending along the tubular member when viewed in the axial direction, for example, when the partition member is formed by casting or injection molding, it is possible to secure the fluidity of the molten material inside the cavity and prevent the mold structure from becoming complicated.

In the above aspect, a plurality of the first communication holes may be provided in the first wall surface at intervals in the radial direction, and the second communication holes may be elongated holes extending in the radial direction and may face the plurality of first communication holes in the axial direction via the movable member.

In this case, since the second communication hole is an elongated hole extending in the radial direction and faces the plurality of first communication holes provided in the first wall surface in the axial direction via the movable member, it is possible to easily secure an overlapping area in which the first communication hole and the second communication hole face each other in the axial direction via the movable member.

INDUSTRIAL APPLICABILITY

The present invention is applied to, for example, automobiles and industrial machines, and can be used as a vibration-damping device that absorbs and dampens the vibration of a vibration generating portion of an engine or the like.

REFERENCE SYMBOLS

1 Vibration-damping device
11 First mounting member
12 Second mounting member
13 Elastic body
14 Main liquid chamber
15 Auxiliary liquid chamber
16 Partition member
16b First wall surface
16f Inner portion
16g Outer portion
19 Liquid chamber
21 Tubular member
24 Orifice passage
41 Movable member
42 Accommodation chamber
42a First communication hole
42b Second communication hole
O Central axis

The invention claimed is:

1. A vibration-damping device comprising:
a first mounting member that has a tubular shape and is connected to any one of a vibration-generating portion and a vibration-receiving portion, and a second mounting member connected to the other of the vibration-generating portion and the vibration-receiving portion;
an elastic body which elastically connects both the first mounting member and the second mounting member;
a partition member which partitions a liquid chamber in which a liquid is sealed in the first mounting member into a main liquid chamber having the elastic body in a part of a partition wall of the main liquid chamber and an auxiliary liquid chamber, in an axial direction along a central axis of the first mounting member; and
a movable member which is accommodated in an accommodation chamber, the accommodation chamber being provided in the partition member to be deformable or displaceable,
wherein the partition member includes an orifice passage through which the main liquid chamber and the auxiliary liquid chamber communicate with each other, a plurality of first communication holes through which the main liquid chamber and the accommodation chamber communicate with each other, and a second communication hole through which the auxiliary liquid chamber and the accommodation chamber communicate with each other,
in the partition member, a tubular member which protrudes in the axial direction toward the elastic body is disposed on a first wall surface in which the plurality of first communication holes open and which forms a part of an inner surface of the main liquid chamber,
the plurality of first communication holes open in both an inner portion located on an inner side than the tubular member and an outer portion located on an outer side than the tubular member of the first wall surface,
two or more of the plurality of first communication holes open on the inner side, and
a part of the first communication hole and a part of the second communication hole face each other in the axial direction via the movable member.

2. The vibration-damping device according to claim 1, wherein shapes of the first communication hole and the second communication hole are different from each other when viewed in the axial direction.

3. The vibration-damping device according to claim 1, wherein the first communication hole is a curved elongated hole which extends along the tubular member when viewed in the axial direction.

4. The vibration-damping device according to claim 3, wherein a plurality of first communication holes are provided in the first wall surface at intervals in a radial direction, and
   the second communication hole is an elongated hole extending in the radial direction, and faces the plurality of first communication holes in the axial direction via the movable member.

5. The vibration-damping device according to claim 2, wherein the first communication hole is a curved elongated hole which extends along the tubular member when viewed in the axial direction.

6. The vibration-damping device according to claim 5, wherein a plurality of first communication holes are provided in the first wall surface at intervals in a radial direction, and
   the second communication hole is an elongated hole extending in the radial direction, and faces the plurality of first communication holes in the axial direction via the movable member.

\* \* \* \* \*